United States Patent [19]

Hendriks

[11] 3,708,628

[45] Jan. 2, 1973

[54] CONNECTION SYSTEMS

[75] Inventor: Hendrik Adrianus Hendriks, Hague, Netherlands

[73] Assignee: De Staat Der Nederlanden, Ten Deze Vertegenwoordigd Door De Directeur-General Der Posterijen, Telegrafie En Telefonie, The Hague, Netherlands

[22] Filed: Aug. 3, 1971

[21] Appl. No.: 168,604

Related U.S. Application Data

[63] Continuation of Ser. No. 94,239, Dec. 1, 1970, abandoned.

[52] U.S. Cl. .................................... 174/60, 317/118

[51] Int. Cl. ............................................ H01r 13/46

[58] Field of Search ............174/59, 60, 44; 317/118; 179/98; 339/198 R, 198 C, 198 K

[56] References Cited

UNITED STATES PATENTS

| | | | |
|---|---|---|---|
| 3,147,337 | 9/1964 | Chennell | 174/60 X |
| 1,639,310 | 8/1927 | Richardson | 174/60 |
| 547,078 | 10/1895 | Johnson | 174/60 |
| 586,464 | 7/1897 | Tobey | 174/60 |

*Primary Examiner*—Bernard A. Gilheany
*Assistant Examiner*—D. A. Tone
*Attorney*—Brenner, O'Brien & Guay

[57] ABSTRACT

A connection box, wherein any one of a large number of first leads can be connected with any one of a large number of second leads. The box is provided with contact devices disposed in an arc of a circle, one or more guide bodies disposed adjacent the center of the circle, and bridges interposed between the guide bodies and the contact devices. The first leads can be directly connected to the contact devices, and the second leads can be passed over the guide bodies and the bridges to the contact devices to be connected thereto, so that the second leads may be of equal length, may directly constitute part of the cables to be introduced, and may be arranged in an accessible and convenient manner.

9 Claims, 14 Drawing Figures

CONNECTION SYSTEMS

The present application is a continuation of my application Ser. No. 94,239, filed Dec. 1, 1970, now abandoned.

This invention relates to a system for making and breaking, without limitations and preferably in a connection box, connections of any one of a large number of incoming leads with any one of a large number of outgoing leads.

In a known system of this kind the ends of the leads of the incoming cables are, in the connection box, fixedly connected to contact devices fixedly disposed in said box, and the ends of the leads of the outgoing cables are also fixedly connected to other contact devices fixedly disposed in the box. Through-connections, if any are necessary, are made by means of so-called jumper wires, one end of such wire being connected to the contact device to which the lead of the incoming cable is connected, and the other end of the wire being connected to the contact device to which the associated lead of the outgoing cable is connected.

In this system, each through-connection requires two fixed contact devices; these occupy space and result in four contact points per through-connection. If, for example, 1,000 incoming leads must be connected to 1,000 outgoing leads, 2,000 fixed contact devices and 1,000 jumper wires are required and 4,000 connections are necessary.

The system according to the invention reduces the number of contact devices in the above example by half, thereby saving space and reducing the number of contact points per through-connection to two.

The system according to the invention is so arranged that there is only one fixed contact device for each given pair of leads to be connected, the fixed contact devices being arranged in circular arcs to which one of the groups of leads is directly and fixedly connected.

Furthermore the system according to the invention is so arranged that the other group of leads is passed over a plurality of guide bodies of suitable shape in the vicinity of the center of the circle and over a plurality of bridges to the fixed contact devices, in such a manner that these leads may all be of equal length and directly constitute part of the incoming cables. This arrangement ensures accessibility of the contact devices and convenient arrangement of the leads.

Further features of the invention are:

a. Many connections are conveniently arranged;

b. Modifications of any desired connection are possible with little effort and without loss of wire;

c. The construction can be adapted to accommodate the need for any number of leads in a simple manner;

d. A connection system may be inexpensively manufactured in that the desired number of contact devices is built up from small standard elements; these elements can be radially disposed in a connection box to produce the desired arcuate shape of the contact devices; and the walls of the elements may be parallel, which simplifies manufacture on a production-line basis.

One embodiment of the invention will be described, by way of example, with reference to the accompanying drawings in which.

Figure 1:
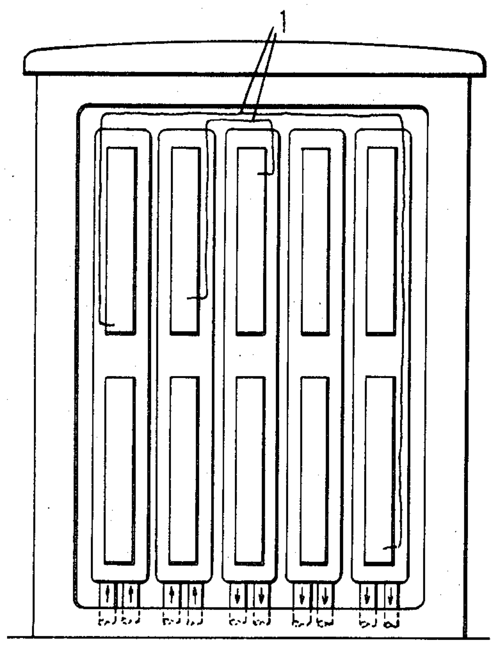
FIG.1 PRIOR ART
FIG. 1 is a front elevational view of a conventional cable distribution head disposed in a box with the door removed.

FIG. 1 illustrates a conventional connection system in which the incoming leads — indicated by an arrow pointing upwards — are connected to contact pins (not shown) in each of the illustrated rectangles. In this known arrangement, each rectangle contains 200 such contact pins to which the outgoing leads are also connected. The connection between a contact pin of the incoming leads with one of the outgoing leads requires a connector or jumper wire 1 to be connected between these pins. Depending on which contact pins must be connected, such wires must be long or short, and when the connections are changed, new wires must often be applied at a loss of wire.

Figure 2:
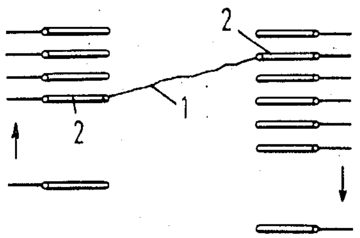
FIG.2 PRIOR ART
FIG. 2 is a diagrammatic view illustrating the connection of leads in the cable distribution head of FIG. 1.

FIG. 2 shows the above situation diagrammatically. There are two contact pins 2 per through-connection and there is a jumper wire 1 interconnected therebetween. Accordingly, there are four connecting points for each through-connection and the various jumper wires will be of different lengths. According to the present invention, either the incoming or the outgoing leads are connected to a set of contact pins.

Figure 5:
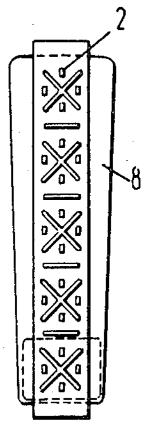
FIG. 5 is a detail of a 20-poled contact block used in the system of FIG. 3.
Figure 6:
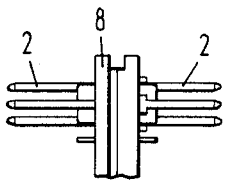
FIG. 6 is a partial side elevational view of the contact block shown in FIG. 5.
Figure 7:
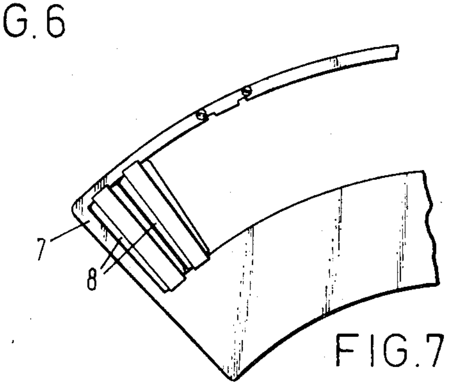
FIG. 7 is a partial front elevational view of a carrier for receiving the contact blocks of FIGS. 5 and 6.
Figure 3:
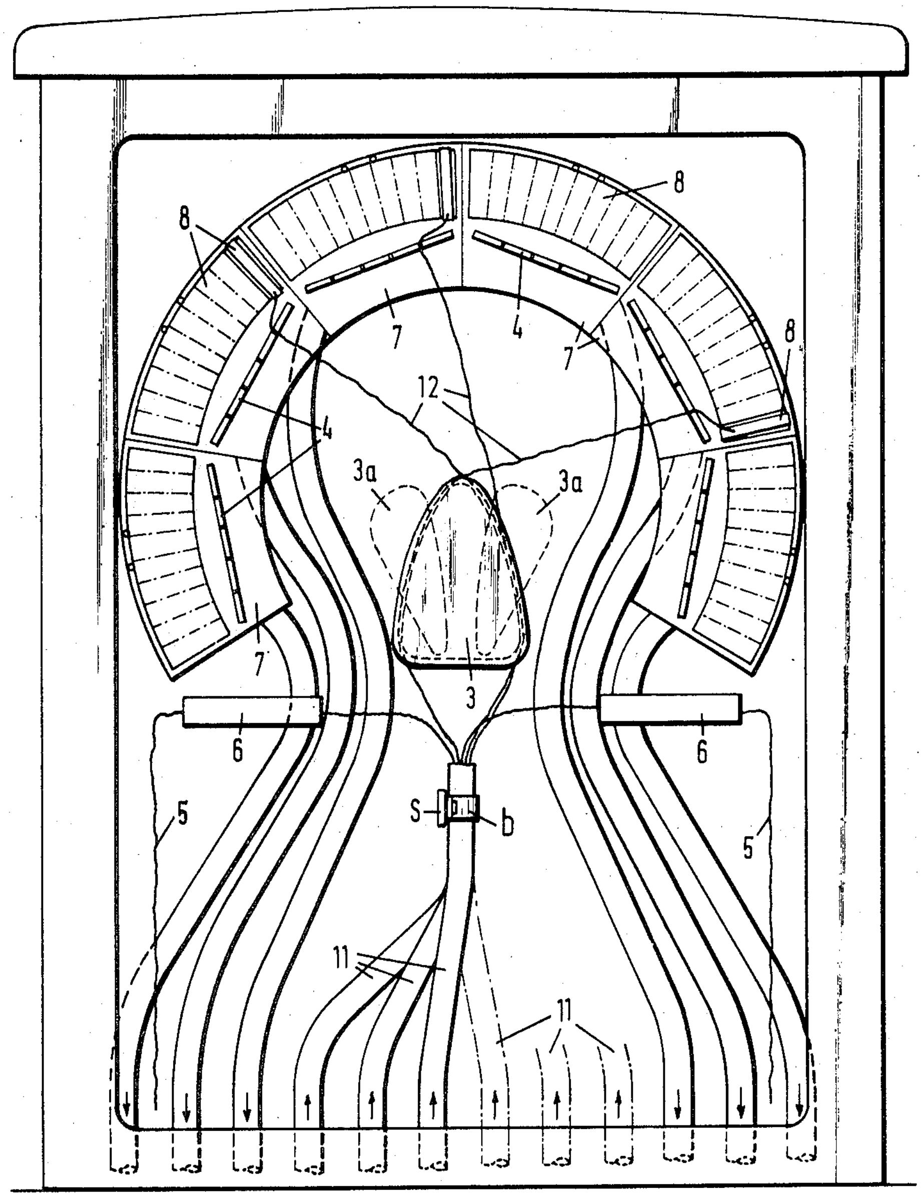
FIG. 3 is a front elevational view of a connection system according to the present invention.

Referring to FIG. 3, which illustrates the connection system of the present invention, the outgoing leads only are each connected to contact pins. These contact pins are disposed in a circular arc. As shown in FIGS. 5 and 6, 20 contact pins are supported in a 20-poled contact block 8 and are arranged to form five star-like groups of four, referred to as quads. Disposed upon a carrier, as shown in FIG. 7, 10 contact blocks 8 are united to provide a field of 200 contact pins. FIG. 3 shows, by way of example, an arrangement with six carriers 7, incorporating 1,200 contact pins for the outgoing leads. The incoming leads 12 are not connected to contact pins, but are united in cables 11 with, for example, 200 leads per cable. The leads 12 are passed either about a guide body 3 or between two spaced guide bodies 3*a* depending upon the preferred design, and thence over bridges 4 disposed on the carriers 7 in a vertical position, to the contact pins 2 of the outgoing leads. By virtue of the illustrated circular arrangement of contact pins 2, all leads 12 may be of equal length.

Figure 4:
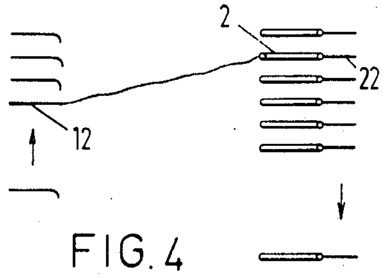
FIG. 4 is a diagrammatic view showing leads in the system illustrated in FIG. 3.

FIG. 4 shows diagrammatically how each incoming lead 12 can be connected to any one outgoing line 22 with only one contact pin 2 and without jumper wires. Incoming leads 5 (FIG. 3) which are not yet connected to a contact pin are passed via magazines or storage clips 6 (FIG. 3) to positions where they are stored for future use. An effective arrangement of these magazines and color coding or numbering of the leads, make it possible for each incoming lead to be readily identified.

Figure 8:
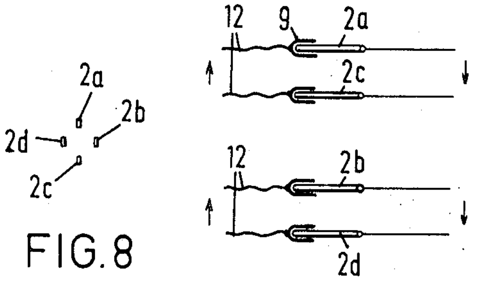
FIG. 8 is a diagrammatic view showing the connection of a group of contact points of the block of FIG. 5 according to the present invention.

FIG. 8 shows how the incoming leads 12 of two circuits can be connected to the four contact pins of an outgoing quad by means of, for example, plug connections 9, such as "Faston clips."

Figure 9:
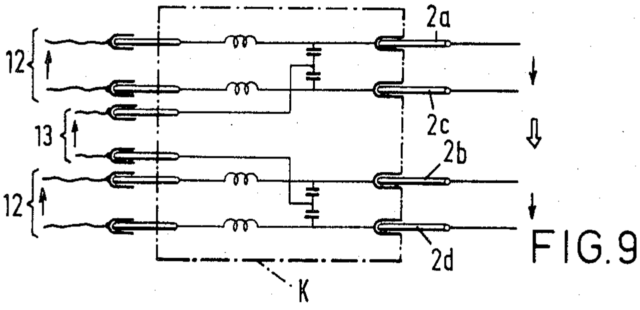
FIG. 9 is a diagrammatic view illustrating the connection of a high-frequency circuit to an outgoing group of contact points in accordance with the present invention.
Figure 10:
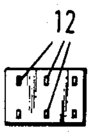
FIG. 10 is a front elevational view of a contact plug incorporating the circuit arrangement of FIG. 9.
Figure 11:
FIG. 11 is a side elevational view of the plug shown in FIG. 10.
Figure 12:
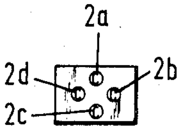
FIG. 12 is a rear view of the plug of FIG. 10.
Figure 13:
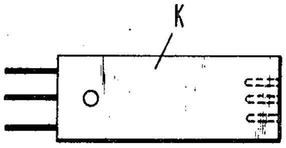
FIG. 13 is a plan view of the plug of FIG. 10.

FIG. 9 shows how, in an embodiment according to the invention, by simply detaching the plug connections and placing a contact plug *k* as per FIGS. 10–13, for example, a high-frequency circuit 13 is superposed on a quad in an extremely fast manner. FIGS. 10–13 show the contact plug with four socket elements and six terminal elements in various views.

Figure 14:
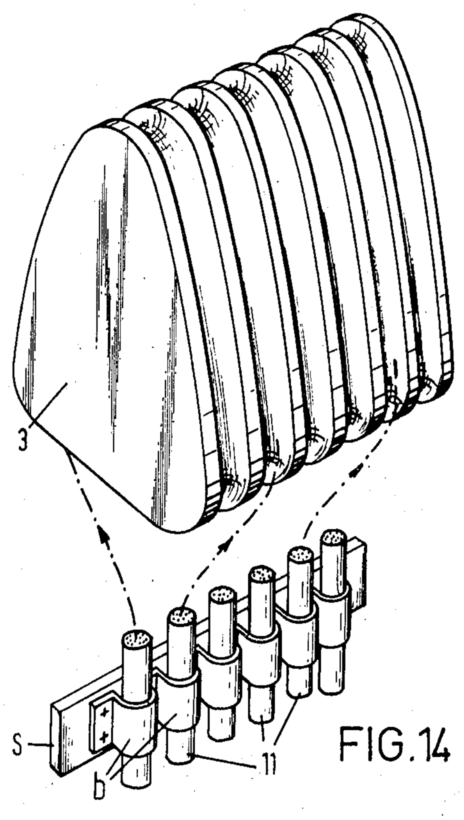
FIG. 14 is a detail of a guide member of the system of FIG. 3.

FIG. 14 shows one embodiment of guide body 3 in more detail. The guide body is triangular or saddle-shaped and defines a plurality of grooves running about its periphery. The six cables 11 are secured to a strip *s* by means of clips *b*. The cables 11 may be mounted in sequence and at different times when needed without impairing the accessibility of the arrangement.

What is claimed is:

1. A connection system for enabling electrical interconnection between first and second sets of wires comprising:
   first and second sets of wires,
   carrier means,
   fixed contact means including a plurality of contact blocks each having a plurality of fixed contacts and being mounted on said carrier means adjacent each other in an arcuate configuration, each of said plurality of fixed contacts being directly connected with a different one of the first set of wires, and
   guide means adapted to support the second set of wires for selective interconnection with said arcuately disposed fixed contact means.

2. The invention as recited in claim 1 wherein said guide means comprises at least one guide member, mounted adjacent the center of the arc defined by said arcuately disposed fixed contact means to constrain the second set of wires at the center of said arc for distribution to said fixed contact means whereby each of the second set of wires may be of equal length.

3. The invention as recited in claim 2 wherein said guide member is substantially triangularly shaped and has an apex disposed adjacent the center of said arc.

4. The invention as recited in claim 1 further comprising bridge means mounted on said carrier means adjacent said fixed contact means for guiding and supporting the second set of wires for connection with said fixed contact means.

5. The invention as recited in claim 1 wherein said fixed contacts of each contact block are disposed in groups of fours.

6. The invention as recited in claim 5 wherein each of said contact blocks is identical and contains an identical number of four-contact groups.

7. The invention as recited in claim 5 further comprising at least one socket means connected with selected ones of the second set of wires, and
   at least one of said groups of four contact elements of said contact blocks including mating plug means adapted to engage said socket means.

8. The invention as recited in claim 7 wherein each said socket means comprises four socket elements for engaging with said mating plug, means six terminals adapted to be connected with the second set of wires, and an electrical network interconnecting said six terminals with said four socket elements.

9. The invention as recited in claim 1 further comprising storage magazines disposed adjacent the ends of said arcuately disposed fixed contact means to receive and store unused ones of the second set of wires.

* * * * *